Oct. 23, 1956    V. S. DANIELSON ET AL    2,767,857
COMBINED FRICTION AND RUBBER SHOCK ABSORBING MECHANISM
Filed June 7, 1952    3 Sheets-Sheet 1

Inventors:
Vernon S. Danielson.
William D. Wallace.
By Henry Fuchs
Atty.

Oct. 23, 1956  V. S. DANIELSON ET AL  2,767,857
COMBINED FRICTION AND RUBBER SHOCK ABSORBING MECHANISM
Filed June 7, 1952  3 Sheets-Sheet 2
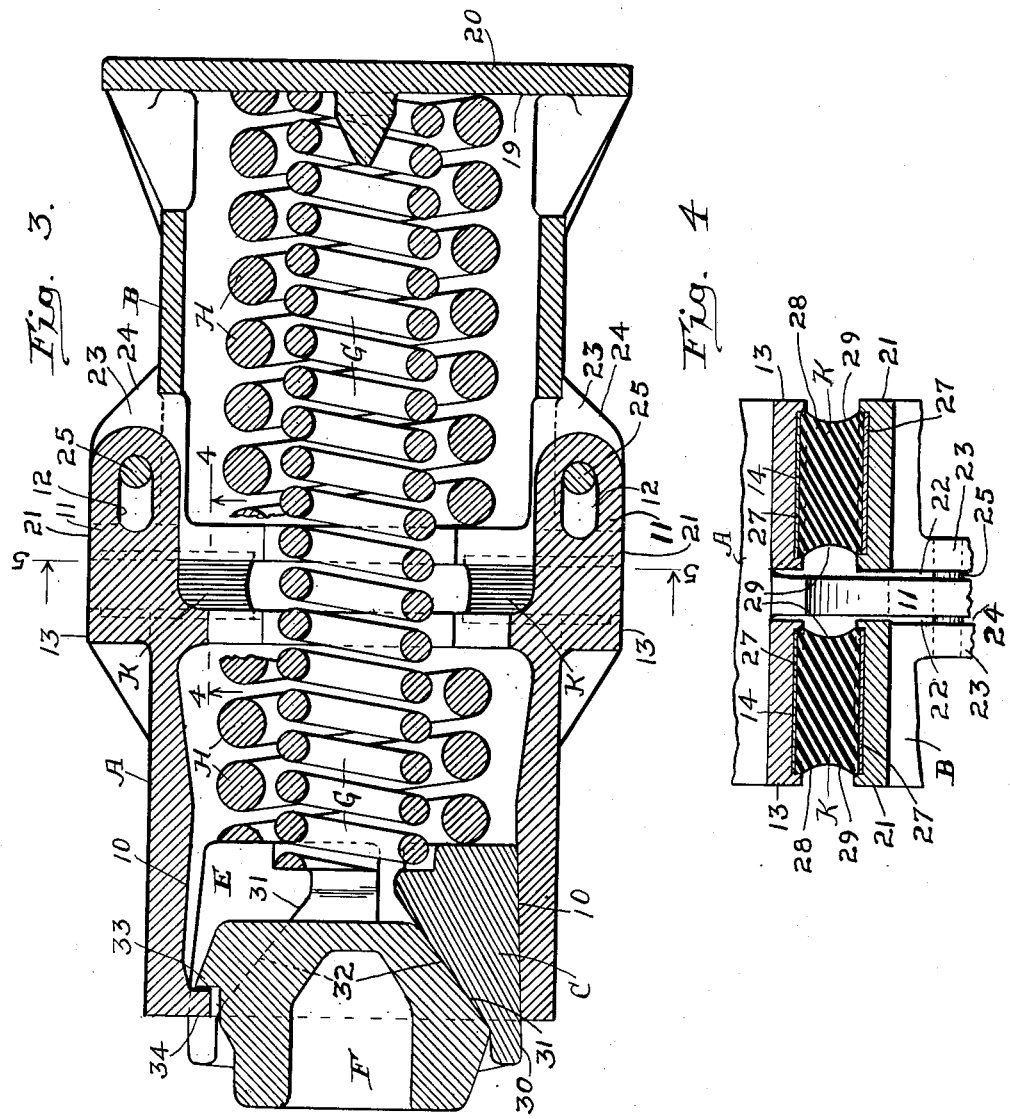
Inventors:
Vernon S. Danielson.
William D. Wallace.
By Henry Fuchs
Atty.

Oct. 23, 1956 V. S. DANIELSON ET AL 2,767,857
COMBINED FRICTION AND RUBBER SHOCK ABSORBING MECHANISM
Filed June 7, 1952 3 Sheets-Sheet 3
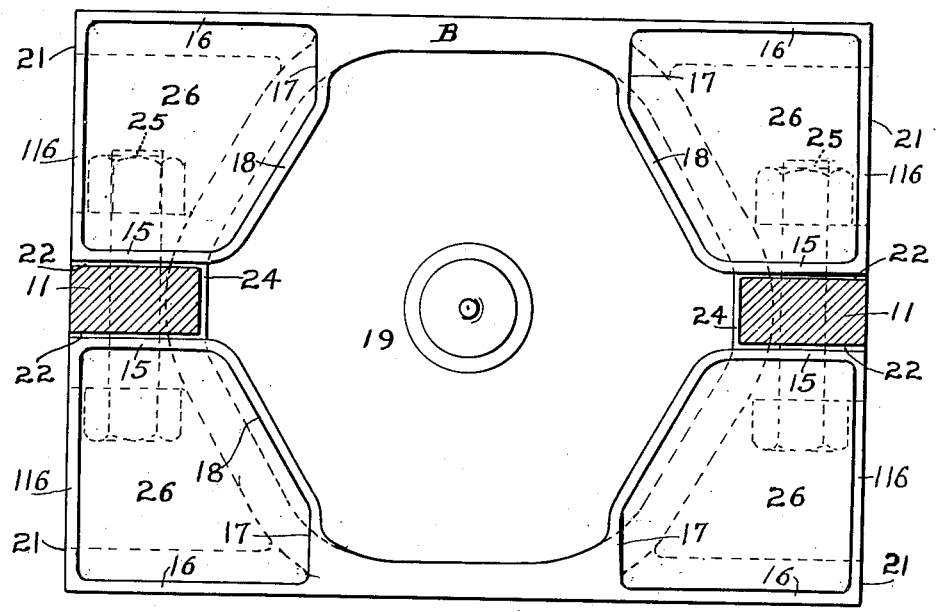
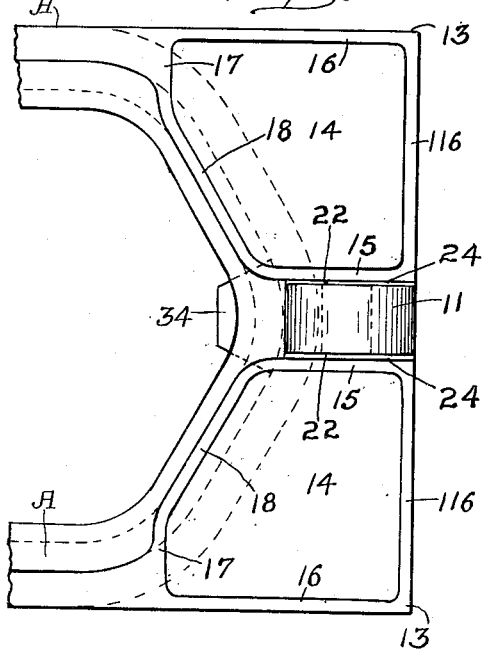
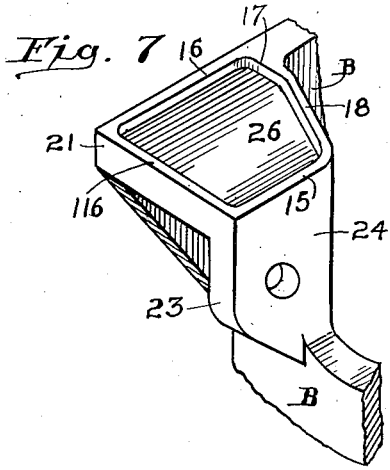
Inventors:
Vernon S. Danielson.
William D. Wallace.
By Henry Fuchs.
Atty.

United States Patent Office
2,767,857
Patented Oct. 23, 1956

2,767,857

COMBINED FRICTION AND RUBBER SHOCK ABSORBING MECHANISM

Vernon S. Danielson, Chicago, and William D. Wallace, Park Forest, Ill., assignors to W. H. Miner, Inc., Chicago, Ill., a corporation of Delaware Application June 7, 1952, Serial No. 292,340

2 Claims. (Cl. 213—34)

This invention relates to improvements in combined friction and rubber shock absorbing mechanism particularly adapted for use in connection with draft riggings of railway cars.

One object of the invention is to provide a shock absorbing mechanism including cooperating, relatively slidable friction means, spring means for opposing relative movement of the friction means, and rubber cushioning means, wherein the spring means and the rubber cushioning means are compressed in parallel during the compression stroke of the mechanism.

Another object of the invention is to provide a shock absorbing mechanism of the character indicated, comprising a friction casing, a spring cage, friction shoes slidingly telescoped within the casing, a wedge spreading member cooperating with the shoes, spring means yieldingly opposing inward movement of the shoes, and rubber cushioning means compressible in parallel with the spring means, wherein the spring cage and friction casing are relatively movable toward and away from each other lengthwise of the mechanism, the spring means is arranged lengthwise within the friction casing and extends into the spring cage, and the rubber cushioning means is interposed between the rear end of the friction casing and the front end of the spring cage, thus insulating the casing and spring cage against metal to metal contact, the rubber cushioning means being compressible in parallel with the spring means of the mechanism.

Other objects of the invention will more clearly appear from the description and claims hereinafter following.

Figure 1:
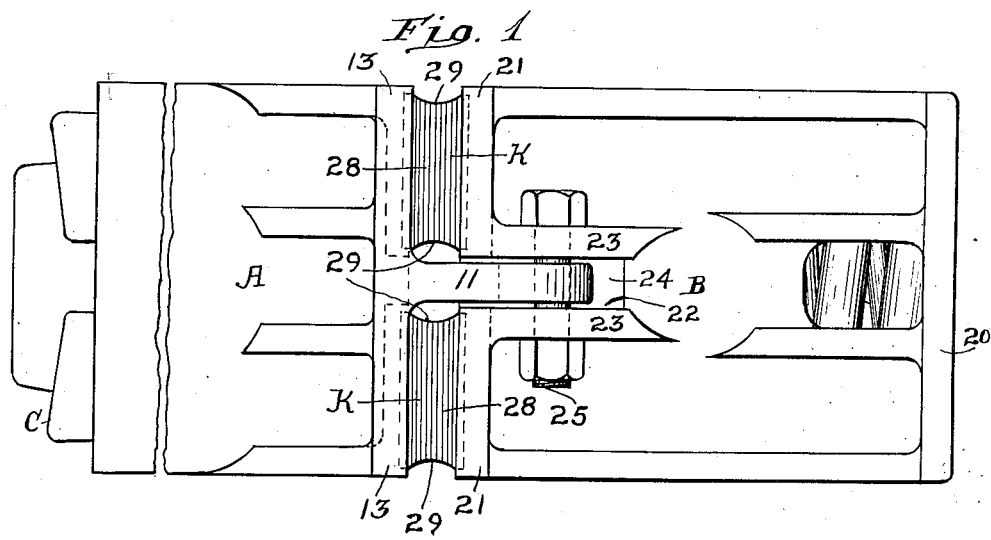
Figure 2:
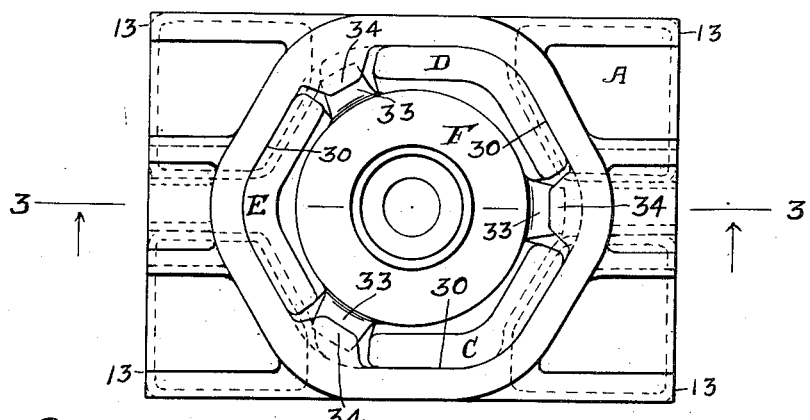
Figure 8:
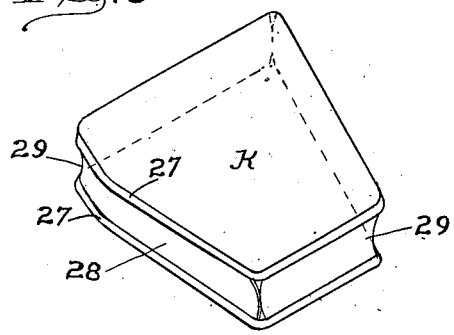

In the accompanying drawings forming a part of this specification, Figure 1 is a side elevational view of our improved combined friction and rubber shock absorbing mechanism. Figure 2 is a front elevational view looking from left to right in Figure 1. Figure 3 is a horizontal longitudinal sectional view, corresponding substantially to the line 3—3 of Figure 2. Figure 4 is a broken sectional view on the line 4—4 of Figure 3. Figure 5 is a transverse vertical sectional view, on an enlarged scale, on the line 5—5 of Figure 3. Figure 6 is a broken rear elevational view of the friction casing illustrated in Figure 1. Figure 7 is a broken detailed perspective view of the lower right hand corner portion of the structure shown in Figure 5. Figure 8 is a detailed perspective view of one of the rubber units of our improved mechanism.

Our improved combined friction and rubber shock absorbing mechanism comprises broadly a friction casing A, a spring cage B, a set of three friction shoes C, D, and E, a wedge F, an inner spring G, an outer spring H, and four rubber cushioning units K—K—K—K.

The friction casing A is in the form of a hollow, tubular member of hexagonal transverse cross section, open at its front and rear ends. The casing A is provided with three interior friction surfaces 10—10—10 at its open end. The friction surfaces 10 are of V-shaped transverse cross section and converge inwardly of the casing. At its rear end, the casing A has a pair of rearwardly projecting arms 11—11, which are located at opposite sides of the casing. Each of the arms 11 has a longitudinal guide slot 12 at its rear end. At the rear end thereof, the casing A is further provided with laterally extending flanges 13—13 which project outwardly from opposite sides of the same and together form a follower of substantially rectangular outline. Each flange 13 is provided with rearwardly facing top and bottom pockets 14—14 adapted to accommodate two of the rubber cushioning units K—K of our improved mechanism. The pockets 14 are of the shape shown in Figure 6, each pocket having horizontal transverse walls 15 and 16, a vertical outer wall 116, a relative short vertical inner wall 17, and an inclined wall 18 connecting the walls 15 and 17.

As shown in the drawings, the pockets 14—14 at each side of the casing A are located directly above and below the arm 11 at the corresponding side of said casing.

The spring cage B is arranged in longitudinal alignment with the friction casing A in back of the latter. As shown in the drawings, the spring cage B is in the form of a hollow tubular member of hexagonal interior and exterior cross section, open at its front end and closed by a transverse wall 19 at its rear end. The wall 19 projects outwardly beyond opposite sides of the cage B to provide an integral rear follower member 20. At the forward end thereof, the cage B is provided with laterally projecting flanges 21—21, which are located at opposite sides of said cage. The flanges 21—21 and the walls of the cage are cut out at opposite sides to provide lengthwise extending slots 22—22 and in association with each slot 22 are top and bottom, lengthwise extending flanges 23—23, which, together with the corresponding slot 22, form a guideway 24, adapted to accommodate and guide the arm 11 at the corresponding side of the casing A. The casing A and the cage B are slidingly guided by the arms 11—11, which extend into the guideways 24—24, and bolts 25—25 extending through the flanges 23—23 of the guideways 24 and the slots 12 of the arms 11. As will be evident, the slots 12—12 into which the bolts 25—25 extend provide for restricted movement in lengthwise direction of the friction casing A with respect to the spring cage B.

The flanges 21—21 of the cage B are provided with forwardly opening pockets 26—26, corresponding in shape and size to the pockets 14—14 of the shell flanges 13—13 of the friction casing, and are arranged in longitudinal alignment therewith, respectively.

The rubber cushioning units K—K—K—K are interposed between the casing A and the spring cage B, each unit being seated in the corresponding aligned pockets 14 and 26 of the same. The units K—K—K—K are shaped to correspond with the pockets 14 and 26 and each unit comprises a pair of plates 27—27 and an interposed rubber pad 28, the pad being vulcanized to the plates and having its peripheral walls inwardly concaved, as indicated at 29.

The friction shoes C, D, and E, which are of similar design, are telescoped within the casing A and are provided with longitudinally extending, V-shaped friction surfaces 30—30—30 in sliding engagement with the V-shaped friction surfaces 10—10—10 of the casing A. Each shoe has a V-shaped wedge face 31 on its inner side.

The wedge F has three V-shaped wedge faces 32—32—32 at its inner end, arranged symmetrically about the central longitudinal axis of the casing A and engaging respectively, with the wedge faces 31—31—31 of the three shoes C, D, and E. The wedge F is further provided with three radially outwardly extending lugs 33—33—33, which extend between adjacent shoes, and are engaged in back of inturned stop lugs 34—34—34 on the casing A to limit outward movement of the wedge F and thus hold the parts of the friction shock absorbing mechanism assembled.

The springs G and H are arranged within the aligned casing A and the spring cage B and together form the main spring resistance of the mechanism. Each of these springs is in the form of a helical coil, having its opposite ends bearing on the inner ends of the shoes C, D, and E, and the rear wall 19 of the spring cage A, respectively.

In the assembled condition of the mechanism, both the springs G and H and the rubber cushioning units K—K—K—K are under a predetermined amount of initial compression.

In assembling the mechanism, the spring cake B is placed on a support in upright position with the open end up. The springs G and H are then placed within the spring cage and the rubber cushioning elements K—K—K—K placed within the seats 26—26—26—26 at the four corners of the spring cage B. The friction casing A is then placed in position over the spring cage B with the inner end downward, resting on the rubber cushioning units K—K—K—K, which are engaged in the seats 14—14—14—14 of said casing A and with the arms 11—11 of the latter engaged in the guideways 24—24 of the spring cage B. The parts thus far assembled are then compressed to the desired extent by forcing the casing A downwardly, and the bolts 25—25 are then applied to secure the casing A to the spring cage B.

The friction shoes are then placed in position within the casing A and forced downwardly to permit application of the wedge F, which is placed upon the shoes and locked in position by rotating the same to engage the lugs 33 thereof in back of the lugs 34 of the casing A.

The operation of our improved shock absorbing mechanism is as follows: During relative movement of the front follower of the usual draft rigging and the casing A toward each other, the wedge F is forced inwardly of the casing A, thereby wedging the shoes C, D, and E apart and sliding the same inwardly on the friction surfaces of the casing against the resistance of the springs G and H. During this action, the rubber cushioning units K—K—K—K are also compressed between the casing and the spring cage due to movement of the casing A toward the cage B, the casing A being frictionally gripped by the shoes C, D, and E at this time. During further compression of the mechanism, after the wedge F has been forced inwardly of the casing to such an extent that the front follower of the draft rigging engages the casing A, the springs G and H and the rubber cushioning units K—K—K—K are further compressed in unison without any further relative sliding movement of the friction shoes C, D, and E and the casing A.

We claim:

1. In a combined rubber and friction draft gear; a friction casing open at both ends; friction shoes and wedge disposed in said casing and projecting forwardly therefrom; a spring cage closed at its rear end and open at its front end, said cage being disposed in axial alignment with and rearwardly of said casing; rubber cushioning units disposed between the rear end of said casing and the front end of said cage; spring means in said cage extending forwardly therefrom through said casing and engaging said shoes and wedge to resist movement thereof inwardly of the casing, compression of said gear being opposed initially by friction between said shoes and casing and by said spring means and rubber units acting in parallel and finally by said spring means and rubber units in parallel after said wedge is telescoped into the casing; and means including slotted ears on said casing and bolts on said cage extending through the slots in said ears for holding the casing and cage together as a unit.

2. A draft gear as specified in claim 1 in which four flanges project outwardly from the rear end of the casing and four flanges project outwardly from the front end of the cage and in which a rubber cushioning unit is disposed between each casing flange and a corresponding cage flange.

References Cited in the file of this patent

UNITED STATES PATENTS

| | | |
|---|---|---|
| 1,378,868 | Johnson | May 24, 1921 |
| 1,894,716 | Sproul | Jan. 17, 1933 |
| 2,439,843 | Dath | Apr. 20, 1948 |
| 2,554,606 | Withall | May 29, 1951 |
| 2,588,488 | Dath | Mar. 11, 1952 |
| 2,692,768 | Withall | Oct. 26, 1954 |